(No Model.)
L. L. BATTLE.
CORN PLANTER.
No. 288,399. Patented Nov. 13, 1883.
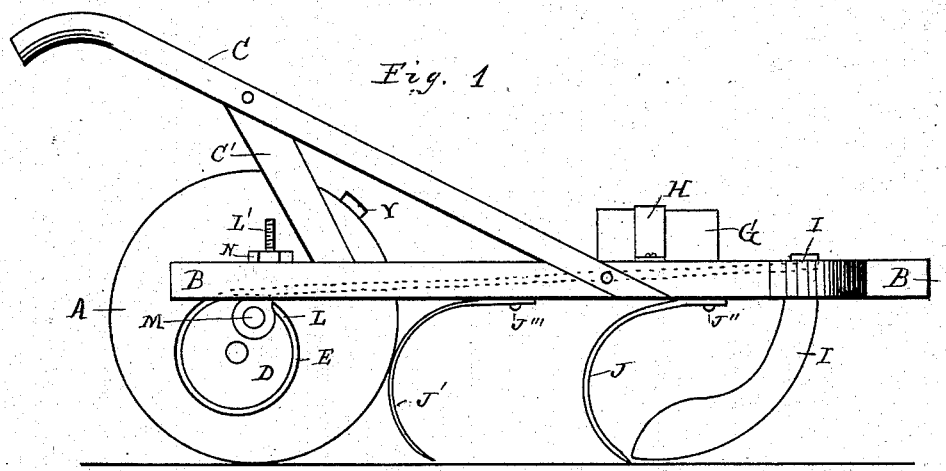
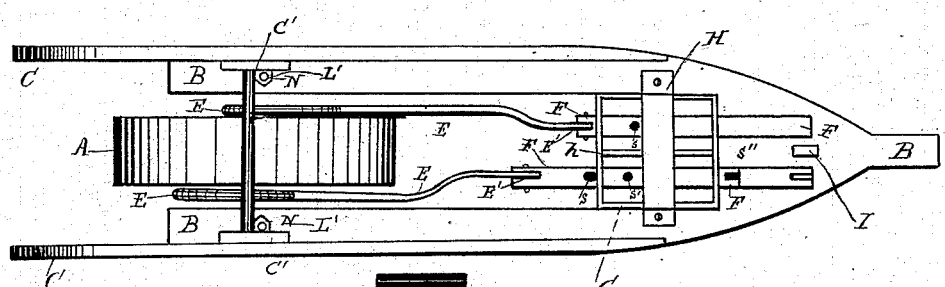
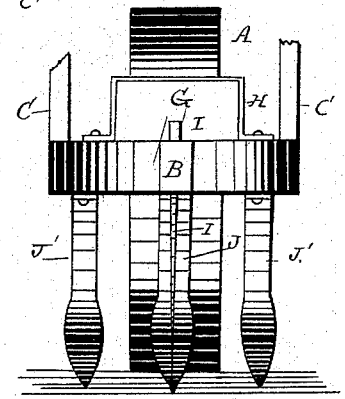
WITNESSES
Morton Toulmin
INVENTOR
L. Battle
ATTORNEY

UNITED STATES PATENT OFFICE.

LUCIUS L. BATTLE, OF WITHE, TENNESSEE.

CORN-PLANTER.

SPECIFICATION forming part of Letters Patent No. 288,399, dated November 13, 1883.

Application filed July 16, 1883. (No model.)

*To all whom it may concern:*

Be it known that I, LUCIUS L. BATTLE, a citizen of the United States, residing at Withe, in the county of Shelby and State of Tennessee, have invented certain new and useful Improvements in Corn-Planters; and I do hereby declare the following to be a full, clear, and exact description of the invention, such as will enable others skilled in the art to which it appertains to make and use the same.

This invention relates to improvements in corn-planters, and has for its object to open a furrow for the introduction of the corn, and to cover and roll the same at one operation, and also to provide a receptacle for a fertilizer, which may be introduced simultaneously with the corn or seed. These objects are attained by the mechanism illustrated in the accompanying drawings, in which—

Figure 1 is an elevation. Fig. 2 is a plan. Fig. 3 is a front view with some of the parts broken away.

The letter B indicates a frame or carriage, supported by a roller, A, which is secured thereto by the axle M, which turns in the boxes L. On each side of the roller A are attached eccentrics D, provided with eccentric-rods E, which are pivoted at the point E' to the slides F, to which they impart a reciprocating motion when the roller A revolves. The bearings L are fastened to the frame B by the bolts L' and nuts N. The slides F have holes S, which become filled with the seed or corn, and at every half-revolution of the roller A one slide or the other is withdrawn a sufficient distance from the seed-box G to permit any seed or corn contained in holes S to drop and fall into the furrow formed by the cutter I and plow J, while the other two plows, J', cover it, and the ridge thus formed is rolled over by the roller A.

Y is a block, which may be secured to the periphery of the roller A in any convenient manner. It may be permanently fixed or adapted to be removed, and is for the purpose of marking the ground at regular intervals at each revolution of the roller, and in this manner make the machine serve the purpose of a check-rower.

The seed-box G is secured to the frame B by the strap H, and is divided into two parts by the partition *h*, in order that one receptacle may contain the corn or seed and the other, when desirable, some kind of fertilizer.

C are handles with which to guide the machine.

The eccentrics, when placed as shown in Fig. 2, will cause the seed or corn to drop at every half-revolution of the roller A; but their position may be so changed as to vary the delivery of the corn or seed and cause it to drop at each revolution.

As the block Y can be adapted to show where the corn is planted by the impression made by it in the ground at each revolution of the wheel A, it serves the purpose to guide the plowman in planting the hill opposite in the next row, as he has no other furrows to govern him, but only the marks made by the block Y.

Having described my invention, what I claim, and desire to secure by Letters Patent, is—

In a corn-planter, the frame B, the colter I, the plows J J', the seed-box G, secured by strap H, and having partition *h*, the slides F F', having perforations S S' S'', the eccentric-rods E, and eccentrics D, secured to roller A, having a check-row marker, Y, the whole in combination, as described, and for the purposes set forth.

In testimony whereof I affix my signature in presence of two witnesses.

LUCIUS LUCULLUS BATTLE.

Witnesses:
C. C. POOLE,
J. P. DOUGLAS.